United States Patent [19]
Kashiwazaki et al.

[11] Patent Number: 5,469,373
[45] Date of Patent: Nov. 21, 1995

[54] PRINTING APPARATUS AND METHOD THAT DESCRIMINATES WHICH ANALYZER SHOULD ANALYZE INFORMATION

[75] Inventors: Masami Kashiwazaki, Kawasaki; Satoshi Nagata, Tama, both of Japan

[73] Assignee: Canon Kabushiki Kaisha, Tokyo, Japan

[21] Appl. No.: 16,461

[22] Filed: Feb. 11, 1993

[30] Foreign Application Priority Data

Feb. 14, 1992 [JP] Japan .................................... 4-028485
Mar. 3, 1992 [JP] Japan .................................... 4-081545

[51] Int. Cl.⁶ .................................................. G06F 15/00
[52] U.S. Cl. .................. 364/550; 395/112; 395/113; 395/106; 395/107; 395/117; 400/16; 400/61; 400/77
[58] Field of Search ............................ 395/101–117; 400/61, 654, 16; 364/550; 345/133

[56] References Cited

U.S. PATENT DOCUMENTS 4,968,159  11/1990  Sasaki et al. .
5,295,233  3/1994  Ota ................................ 395/115 OR
5,306,102  4/1994  Ota ................................ 395/115 X

OTHER PUBLICATIONS

Pat. Abs. Jp. vol. 7, No. 224 (P–227) Oct. 5, 1983 (JP–A–58114289).

Pat. Abs. JP. vol. 14, No. 516 (P–1130) Nov. 13, 1990 (JP–A–2216521).

Primary Examiner—Emanuel T. Voeltz
Assistant Examiner—Kamini Shah
Attorney, Agent, or Firm—Fitzpatrick, Cella, Harper & Scinto

[57] ABSTRACT

The present invention provides an output apparatus comprising plural analyzation units for analyzing data having different code systems, and a system for identifying which of the plural analysis units is best fitted for a given body of data.

20 Claims, 9 Drawing Sheets

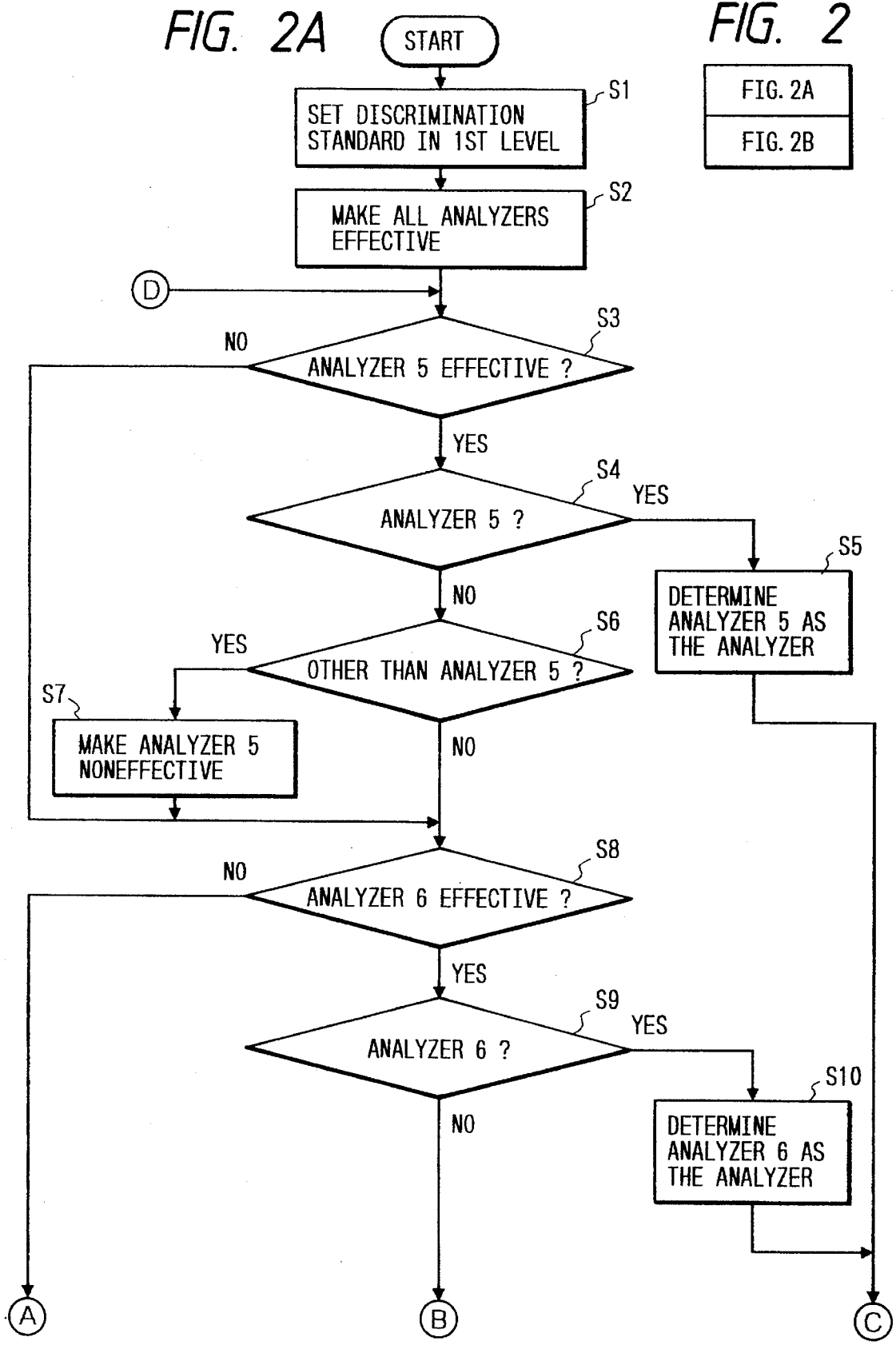

FIG. 6A

CONTROL LANGUAGE 1

|   | COMMAND CODE | PROCESSING |
|---|---|---|
| 1 | 1 B (hex) @ | INITIALIZE PRINTER |
| 2 | 1 B (hex) M | SELECT 12 CPI FONT |
| 3 | 1 B (hex) P | SELECT 10 CPI FONT |
| 4 | 1 B (hex) C | SET PAGE LENGTH |
| ⋮ | ⋮ | ⋮ |

FIG. 6B

CONTROL LANGUAGE 2

|   | COMMAND CODE | PROCESSING |
|---|---|---|
| 1 | 1 B (hex) C | INITIALIZE PRINTER |
| 2 | 9 B (hex) P | DESIGNATE SHEET SIZE |
| 3 | 9 B (hex) 0 K | SELECT 10 CPI FONT |
| 4 | 9 B (hex) 1 K | SELECT 12 CPI FONT |
| ⋮ | ⋮ | ⋮ |

| COMMAND | HEX CODE | A | B | C |
|---|---|---|---|---|
| SI | 0F | ○ | ○ | × |
| XON | 11 | ○ | × | × |
| DC1 | 11 | × | ○ | × |
| DC2 | 12 | × | ○ | × |
| XOFF | 13 | ○ | × | × |
| DC3 | 13 | × | ○ | × |
| DC4 | 14 | × | ○ | × |
| CAN | 18 | × | ○ | × |
| ESC | 1B | ○ | ○ | ○ |
| IS2 | 1E | ○ | × | × |
| IS1 | 1F | ○ | × | × |
| SP | 20 | ○ | ○ | × |
| DEL | 7F | ○ | × | × |
| ESC : | 1B 3A | × | ○ | × |
| ESC < | 1B 3C | ○ | × | × |
| ESC = | 1B 3D | ○ | ○ | ○ |
| ESC > | 1B 3E | × | × | × |
| ESC ? | 1B 3F | ○ | × | ○ |
| ESC ? DC1 | 1B 3F 11 | × | × | ○ |

PRINTING APPARATUS AND METHOD THAT DESCRIMINATES WHICH ANALYZER SHOULD ANALYZE INFORMATION

BACKGROUND OF THE INVENTION

1. Field of the Invention

The present invention relates to an output method and apparatus for performing analyzation processing on the basis of inputted information and for outputting the result.

2. Related Background Art

In the past, it is known to provide a printing apparatus which corresponds to plural kinds of print control codes so as to answer or correspond it to one of various external devices (host computers) or answer it to one of application softwares operating on the corresponding host computers.

It is practical that an operator determines, via an operation panel, which print control code system is to be used for the processing; but there was an apparatus wherein the print control codes were switched on the basis of Western commands.

However, in the above-mentioned conventional apparatus, the operator must grasp whether the printing apparatus does not select the erroneous print code system whenever the actual printing operation is effected. Otherwise, it was feared that the unexpected result was obtained.

Conventionally, there are control command groups (referred to as "control languages" hereinafter) for controlling such printing apparatuses, and characters and/or figures are described or drawn on the basis of the control language. However, since the control languages have different command codes for recognizing the command, depending upon various printing apparatuses, unless the control language matching with the printing apparatus to be used is outputted, the correct drawing or description cannot be attained. Thus, normally, the printing apparatus is designed so that it loads or incorporates not only the inherent language for controlling the printing apparatus but also languages to be used with other printing apparatuses as emulation, thereby interpreting a plurality of control languages.

Conventionally, in such printing apparatus incorporating a plurality of control languages, the various control languages were manually switched via an operation panel associated with the printing apparatus, or were switched by sending the switching command prior to the transfer of the control language.

However, in such printing apparatus capable of interpreting a plurality of control languages, it was impossible to automatically judge which control language corresponds to the input data.

SUMMARY OF THE INVENTION

An object of the present invention is to provide an output method and apparatus which can perform the proper analyzation for the input data without specific instruction, thereby obtaining an intended image.

Another object of the present invention is to provide an output apparatus which can perform the analyzation processing regarding the input data from an external device and comprise N (e.g., a plurality of sets) analyzing means for analyzing data having different code systems, a judging means for gradually or steppingly (i.e., in steps) judging the correspondence of the analyzation means to the input data, and a selection means for selecting one of N analyzation means on the basis of the judged result from the judging means.

A further object of the present invention is to provide an input method wherein the correspondence of various analyzation means to the input data is judged, so that the anlyzation means having the highest correspondence is selected.

A still further object of the present invention is to provide an input method and apparatus which can output by automatically discriminating the input data without emitting the manual switching command or the switching command.

A further object of the present invention is to provide an output apparatus which can input the data including control command and perform output processing corresponding to the control command, and comprises a discrimination means for discriminating a control command system by interpreting the control command included in the input data and an output processing means for performing the output processing on the basis of the discriminated result from the discrimination means.

A further object of the present invention is to provide an output apparatus which comprises a registration means for storing or registrating a plurality of control commands, a discrimination means for discriminating a control command system by judging the coincidence or discordance between a command code of control command included in the input data and a command code of the control command registered in the registration means, and a display means for displaying the discriminated result from the discrimination means.

A still further object of the present invention is to provide an output apparatus comprising a command registration controlling means for performing registration processing of control commands into a registration means in accordance with the frequency of use of the control commands.

The other object of the present invention is to provide an output method comprising the steps of receiving data outputted from a host computer and the like, discriminating a control command system by a discrimination means for discriminating coincidence or decordance between a command code of control command included in the data and a command code of control command registered in a registration means, performing output processing on the basis of the control command system discriminated by the discrimination means, displaying the kind of the control command system, deleting the command code having low frequency of use, and registering the command code having high frequency of use.

BRIEF DESCRIPTION OF THE DRAWINGS

FIGS. 6A and 6B are views showing a language system for the printing apparatus of FIG. 5;

DETAILED DESCRIPTION OF THE PREFERRED EMBODIMENTS

The present invention will now be explained in connection with embodiments thereof with reference to the accompanying drawings.

Before the present invention is fully described, a laser beam printer to which the present invention is applied will be briefly explained with reference to FIG. 4.

Figure 4:
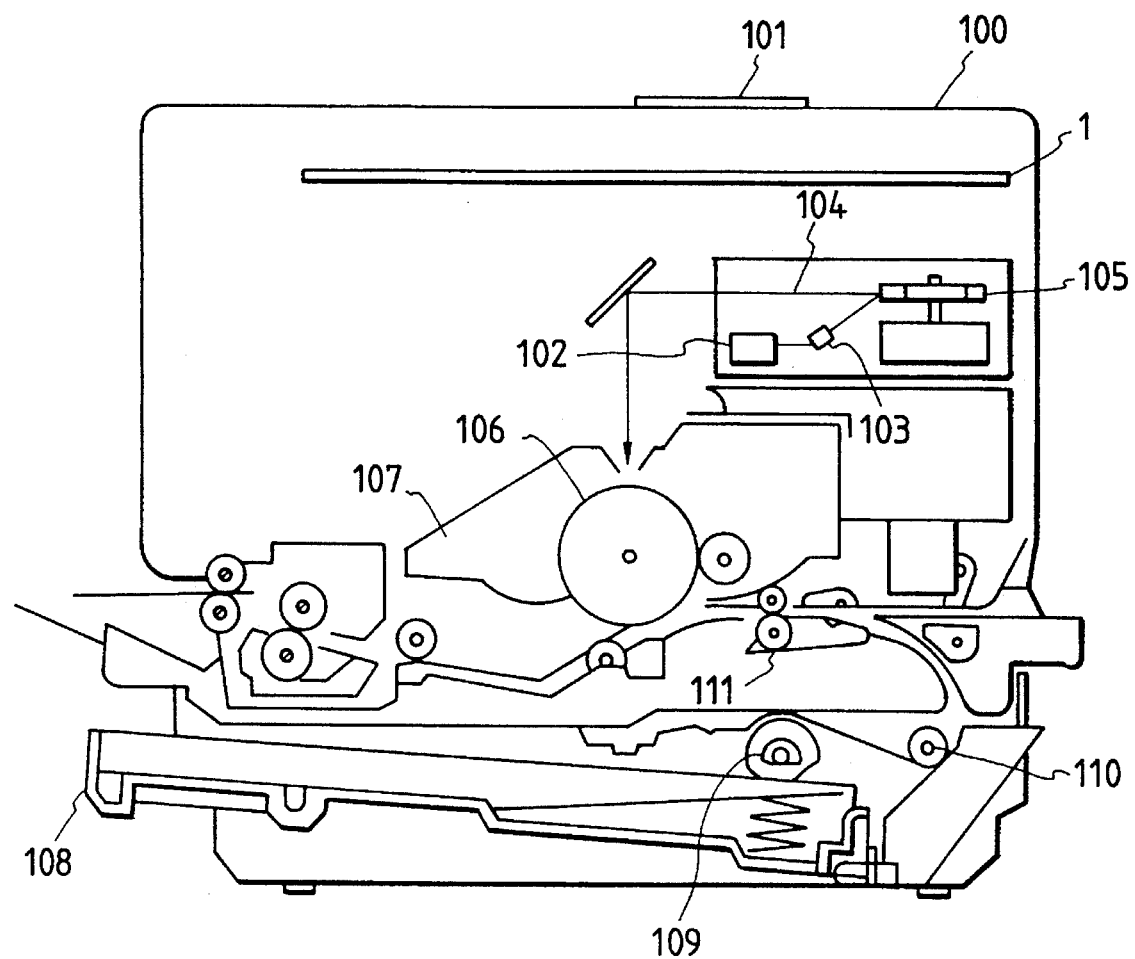
FIG. 4 is an elevational sectional view of a laser beam printer.

In FIG. 4, a laser beam printer 100 is so designed as to store print information (character codes and the like), form information or macro commands supplied from an external host computer connected to the printer, to form a corresponding character pattern or form pattern on the basis of such information and to form an image on a recording sheet as a recording medium. The printer has an operation panel on which switches and LED displays for the operation are arranged, and a printer control unit 1 for performing the control for the whole laser beam printer 100 and for analyzing the character information supplied from the host computer. The printer control unit 1 mainly serves to convert the character information into a corresponding video signal of a character pattern and to output the signal to a laser driver 102.

The laser driver 102 comprises a circuit for driving a semi-conductor laser 103 so that laser beam 104 emitted from the semi-conductor laser 103 is switched ON or OFF on the basis of the input video signal. The laser beam 104 is deflected to the left and right by a rotating polygon mirror 105 to scan and expose an electrostatic drum 106. Consequently, an electrostatic latent image corresponding to the character pattern is formed on the electrostatic drum 106. The latent image is developed by a developing unit 107 disposed around the electrostatic drum 106 and then is transferred onto the recording sheet. A cut sheet is used as the recording sheet. The cut sheets are stacked in a sheet cassette 108 mounted on the laser beam printer 100, and each cut sheet is supplied into the printer by a sheet supply roller 109 and is sent to the electrostatic drum 106 by feed rollers 110,111.

Figure 1:
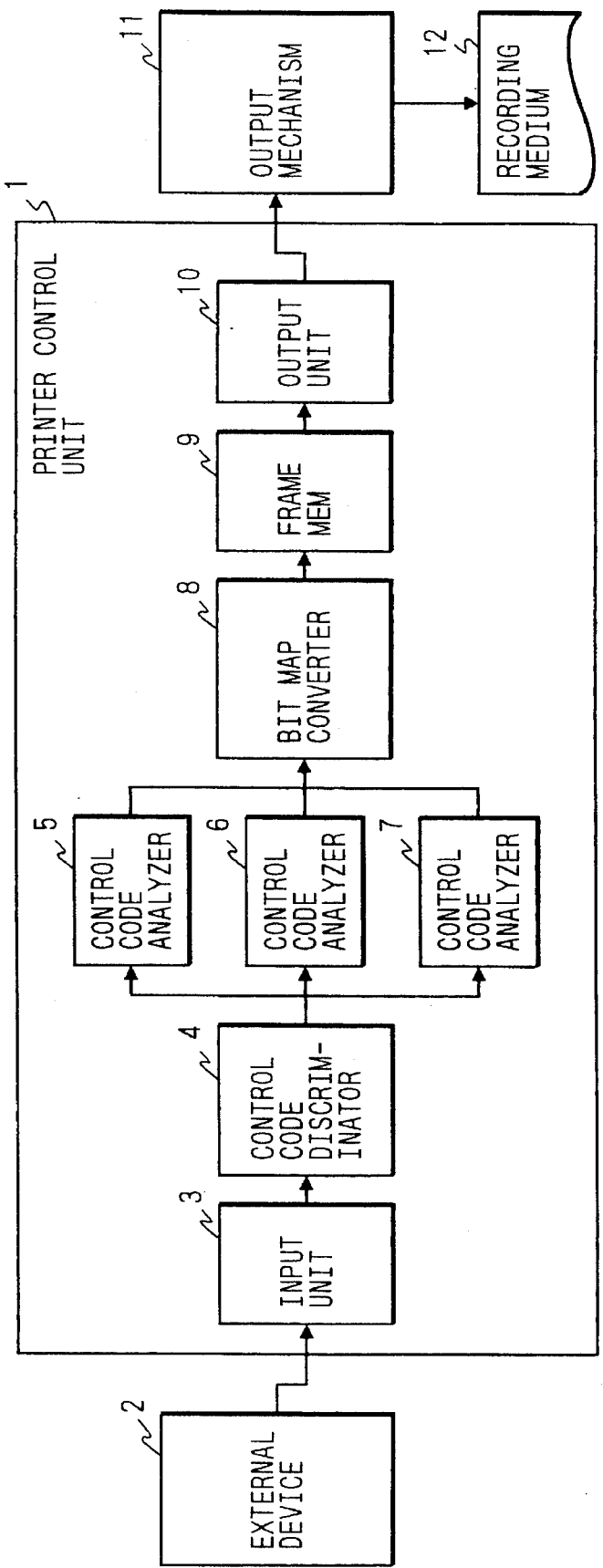
FIG. 1 is a block diagram showing a flow of the processing for a printing apparatus according to a preferred embodiment of the present invention.

Next a control system for the printer (FIG. 1) will be explained. FIG. 1 is a block diagram showing a flow of the processing for the printer control unit 1. In FIG. 1, the reference numeral 2 denotes an external device which is a print data generating source; 3 denotes an input unit; 4 denotes a control code discriminator; 5, 6, 7 denote control code analyzers; 8 denotes a bit map converter; 9 denotes a frame memory; 10 denotes an output unit; 11 denotes an output mechanism; and 12 denotes a recording medium.

The data sent from the external device 2 is temporarily stored in the input unit 3. When the data stored in the input unit 3 reaches a predetermined reference value, or when a predetermined time period is elapsed after the last data has been stored in the input unit even if the data does not reach the predetermined reference value, the data stored in the input unit 3 is sent to the control code discriminator 4, where the discrimination processing is effected.

There is a reason why the discrimination processing is effected after a certain amount of the print data is stored. That is to say, it is dangerous to determine the code systems of the further data on the basis of only one control code, and the reliability of the determined result will be increased when a certain number of control codes are used for the determination. Ideally, it is desirable that, after all of the print data of one print job sent from the external device 2 are inputted, the contents thereof are determined. However, to do so, it takes a very long time to complete the printing. Thus, in the illustrated embodiment, when the data for several hundred bites are inputted or when a predetermined time period is elapsed after the last data has been inputted if the data themselves are a few, the discrimination processing is effected.

Therefore, when the data to be judged are stored in the input unit 3, the control code discriminator 4 judges which control code analyzer 5, 6 or 7 corresponds to the control code in the data, and selects the corresponding control code analyzer from among the control code analyzers 5 to 7, and sends the input print data to the selected control code analyzer. The information processed by the selected control code analyzer is sent to the bit map converter 8, with the result that an output image in the form of the bit map memory for one page is formed on the frame memory 9. The output unit 10 controls ON/OFF of the laser beam of the output mechanism 11 on the basis of the frame memory, thereby recording the print result on the recording medium 12 such as a recording sheet.

Now, the control code discriminator 4 in the illustrated embodiment will be explained in more detail. The discrimination standard for the control code in the control code discriminator 4 can be divided into the following three LEVELs. In this case, the discrimination standard in the first LEVEL is most severe, and the discrimination standard is relaxed as the LEVEL goes on.

First LEVEL: In this LEVEL, there is the inherent feature that the control code can be judged to correspond to the specific analyzer. Or, there is the apparent or clear feature that the control code can be judged not to correspond to the specific analyzer.

Second LEVEL: In this LEVEL, there is the feature wherein the control code is not inherent to the specific analyzer but can be judged substantially to correspond to the specific analyzer. Or, there is the feature that the control code can be judged substantially not to correspond to the specific analyzer.

Third LEVEL: In this LEVEL, it can be judged that the printing is effected on the basis of the specific analyzer without problem.

To effect the above-mentioned judgment, the control code discriminator 4 is provided with a memory for storing all of (or a part of) the control code systems used in the control code analyzers 5 to 7. Among them, the control codes inherent to the analyzers themselves (or control codes which cannot be analyzed by the other analyzers) are set to be automatically discriminated (for example, providing a flag and the like).

Actually, in the first LEVEL, it is judged whether there are control codes inherent to the analyzers from among the data stored in the input unit 3. If the specific analyzer cannot be determined by the judgement in the first LEVEL, the judgement level is lowered so that the judgement is effected on the basis of the second LEVEL. Although the judgement processing in the second LEVEL is as mentioned above, a concrete example thereof is as follows. That is to say, the connection between a series of control codes is checked. More particularly, a particular relational case where a control code A and a control code B are common to the analyzer but the control code B is contiguous to the control code A or a particular relational case where a control code A and a control code B are common to the analyzer but the control code B is not contiguous to the control code A is checked. Accordingly, the relational information between the control codes to be used to the analyzers as well as the above-mentioned information are stored in the control code discriminator 4. If the specific analyzer cannot be determined by the judgement in the second LEVEL, the judgement level is lowered so that the judgement is effected on the basis of the third LEVEL. In this LEVEL, it is merely judged whether the input control code can be analyzed by each analyzer. If it should be judged that the input data cannot be analyzed by all of the analyzers, the print data is sent to an additional predetermined analyzer.

Figure 2B:
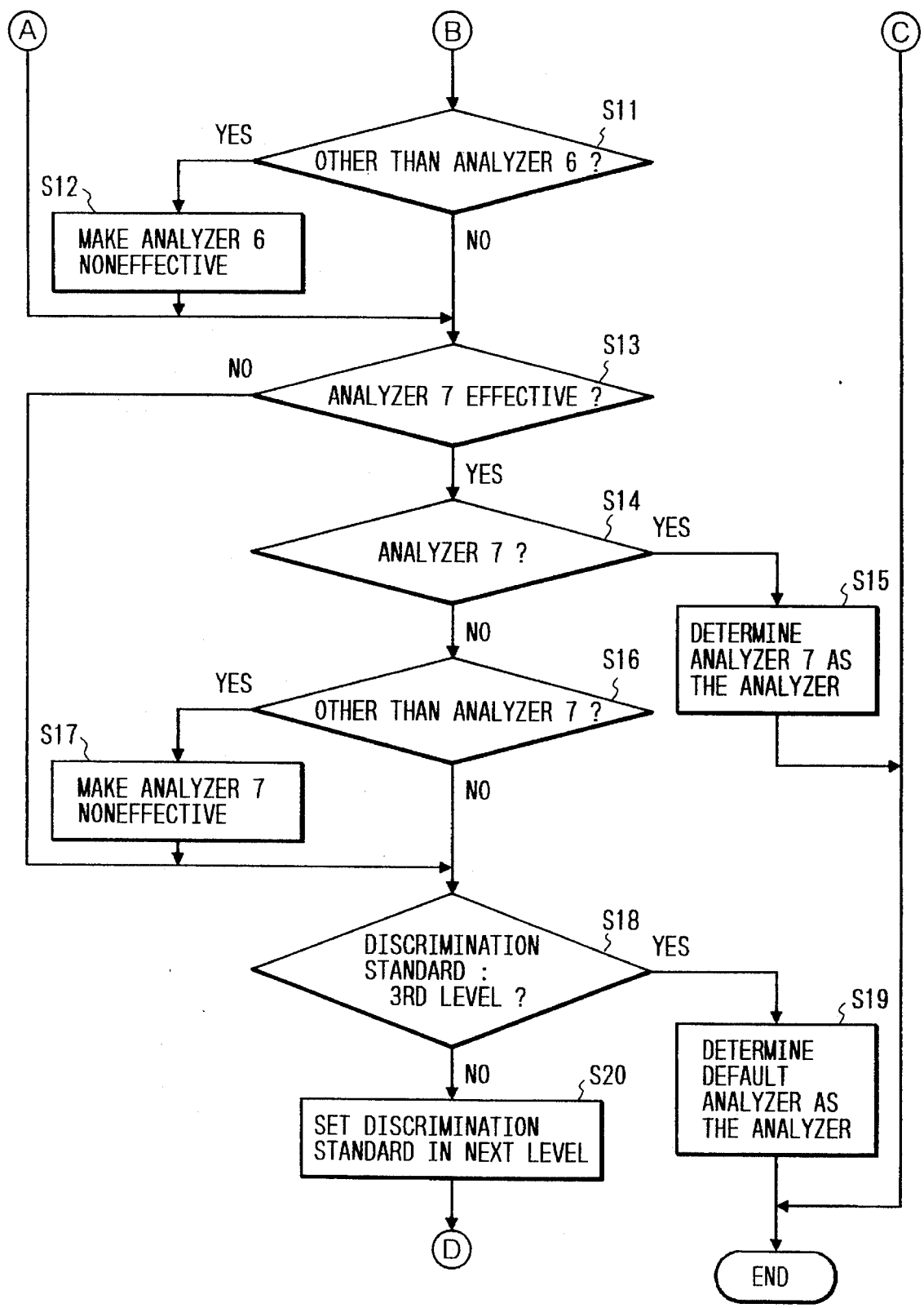
FIG. 2, which is comprised of FIGS. 2A and 2B, is is a flow chart showing the processing in a control code discriminator.

An algorism of the operation processing of the control code discriminator 4 according to the illustrated embodiment for achieving the above-mentioned processing is shown in a flow chart of FIG. 2 which is comprised of FIGS. 2A and 2B. Now, the flow chart will be explained in order.

First of all, in a first step S1, the discrimination standard is set in the first LEVEL which is most severe in the control code discriminator 4. In a next step S2, all of the control code analyzers 5 to 7 are initially made effective. Incidentally, it should be noted that the control code analyzers 5 to 7 according to the illustrated embodiment have the analyzation priority order (for example, in the illustrated embodiment, the control code analyzer 5 has the higher priority order than that of the control code analyzer 6 which has in turn the higher priority order than that of the control code analyzer 7). Accordingly, for example, if it is judged that the analyzation processing is effected in the control code analyzer 6, the judgement regarding the control code analyzer 7 will be omitted.

In a step S3, it is judged whether the control code analyzer 5 is now effective. If the processing is transferred from the step S2, since all of the analyzers were made effectives, the processing goes to a step S4. In the step S4, the data stored in the input unit 3 is checked and it is judged whether such data corresponds to the control code analyzer 5. If the data corresponds to the control code analyzer 5, the processing goes to a step S5, where the control code analyzer 5 is determined as a control code analyzer for processing the input print data.

On the other hand, if it is judged that the input print data cannot be processed by the control code analyzer 5 at the present judgement level, the processing goes to a step S6, where it is checked whether the data can be judged as one not corresponding to the control code analyzer 5. If it is judged that the data cannot be analyzed by the control code analyzer 5, the processing goes to a step S7, where the control code analyzer 5 is made noneffective.

Next, the processing goes to a step S8, and the same processing as described in connection with the steps S3 to S7 is performed with respect to the control code analyzer 6. If the control code analyzer 6 cannot be determined as a control code analyzer for processing the data, the same processing is performed with respect to the control code analyzer 7 (steps S12 to S17).

If the control code analyzer 7 cannot be determined as a control code analyzer for processing the data, the processing goes to a step S18, where it is judged whether the present judgement level is the third LEVEL. If it is judged that the present level is the third LEVEL (which cannot be further lowered), the processing goes to a step S19, where the predetermined analyzer is selected, and then the processing is ended. If the present level is the first or second LEVEL, the processing goes to a step S20, where the LEVEL is lowered to the next one, and the processing returns to the step S3, thereby repeating the aforementioned processing. Incidentally, regarding the control code analyzer(s) which has already judged as the non-related analyzer (i.e. which has been made noneffective) in the previous steps, the judgement is not performed (steps S3, S8 and S13). In this way, since the useless judgement can be omitted, the processing speed can be shortened.

Figure 3:
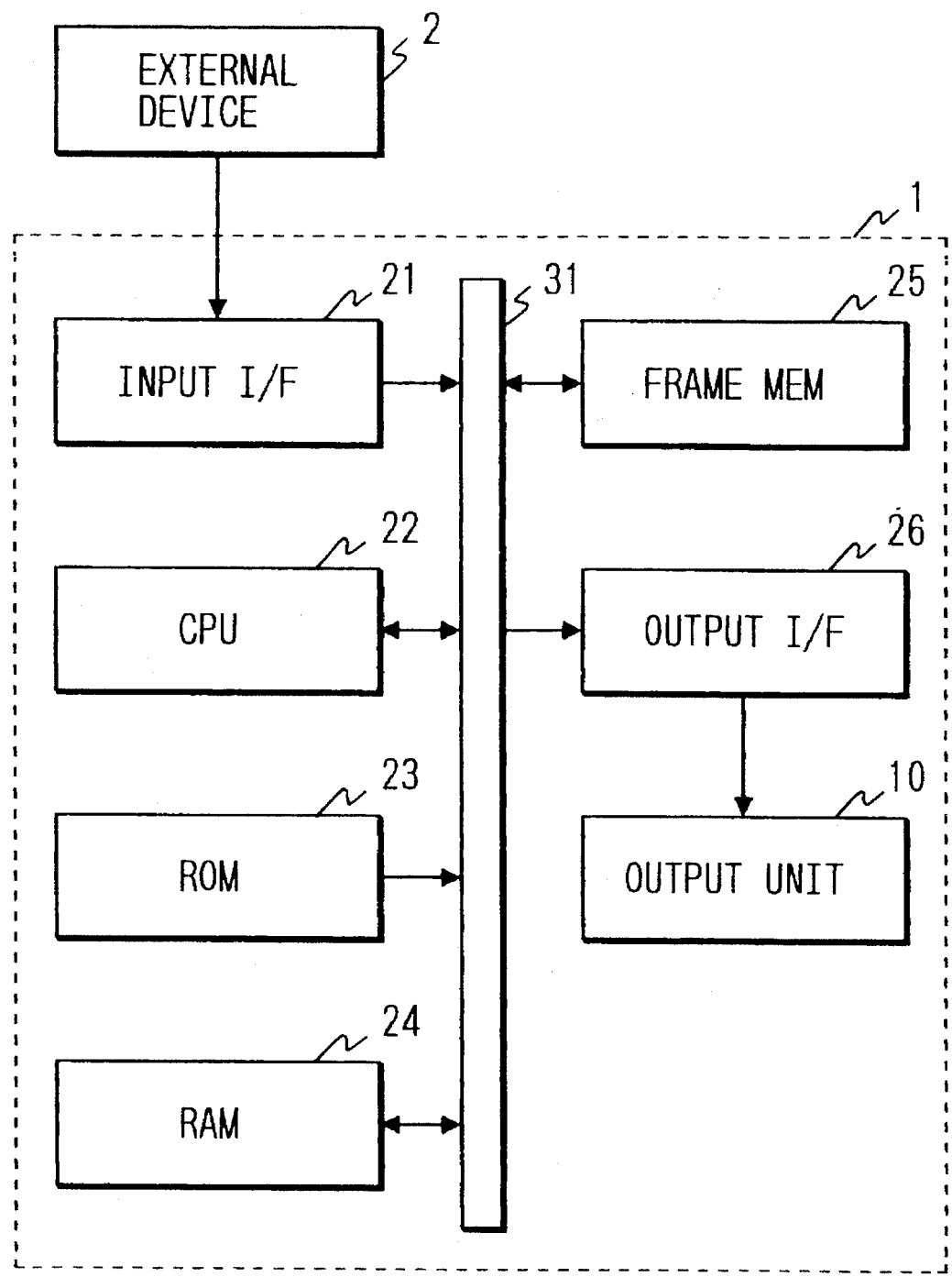
FIG. 3 is a block diagram showing a concrete construction of the printing apparatus.

Now, the concrete construction of the printer control unit 1 according to the illustrated embodiment will be described with reference to FIG. 3. In FIG. 3, the reference numeral 1 denotes the printer control unit and 2 denotes the external device from which the print information is outputted. The printer control unit 1 comprises an input interface (I/F) 21 for receiving the print information from the external device 2, a CPU 22 for controlling the whole control unit 1, a ROM 23 for storing the processing sequence (program shown by the flow chart in FIG. 2 and the like) for the CPU 22 and for storing the character patterns and the like, a RAM. 24 used as a work area for the CPU 22 and an input buffer for storing the print data sent from the external device 2 and adapted to store page data and the like for forming an output image for one page on the basis of the input print data, a frame memory 25 for developing the output image and comprising a RAM, and an output interface (I/F) 26 for outputting the output image to an output unit 10 by which the actual printing is effected. These elements 21–26 are connected to a system bus 31.

As mentioned above, according to the present invention, in a printing apparatus having a plurality of control code analyzers, since the proper control code analyzer to be used can be automatically selected by analyzing the control code sent from the external device, it is not required for the operator to previously set the control code analyzer to be used via the operation panel and via the particular command from the external device, thus facilitating the connection between the printing apparatus and the external device.

Further, since there are a plurality of standards for the control code discrimination in which the discrimination procedure is effected by using such standards from the most severe one and, when a given control code was judged not to correspond to the particular analyzer, further discrimination procedures regarding such-analyzer are inhibited, it is possible to easily perform the control code discrimination processing with high accuracy and to shorten the discrimination processing time.

Incidentally, in the above-mentioned embodiment, the discrimination standard in the control code discriminator 4 is not limited to three LEVELs, but may include any number of LEVELs. Further, the control code analyzers 5, 6, 7 are not limited to three, and two analyzers or four or more analyzers may be used. Furthermore, each control code analyzer and a control code discriminator corresponding thereto may be provided as a single program unit, and a plurality of program units may be freely combined at need, thereby providing a printing apparatus having the extensibility or versability.

Further, in the illustrated embodiment, while an example that the output apparatus is incorporated into the printing apparatus itself was explained, the output apparatus according to the present invention may be an independent apparatus arranged between the host computer and the printing apparatus. In this case, the image data developed in the frame memory 25 (FIG. 3) may be outputted to the printer. Further, as the case may be, the input data may be converted prior to be sent to the printer. Accordingly, the present invention is not limited by the above-mentioned printing mode of the printer.

As mentioned above, according to the present invention, it is possible to perform the proper analyzation of the print data without any specific instruction, thereby obtaining the intended image.

Further, since one of the analyzer means is selected on the basis of a certain amount of data, the reliability of the selection can be improved.

Next, another embodiment of the present invention will be explained.

Figure 5:
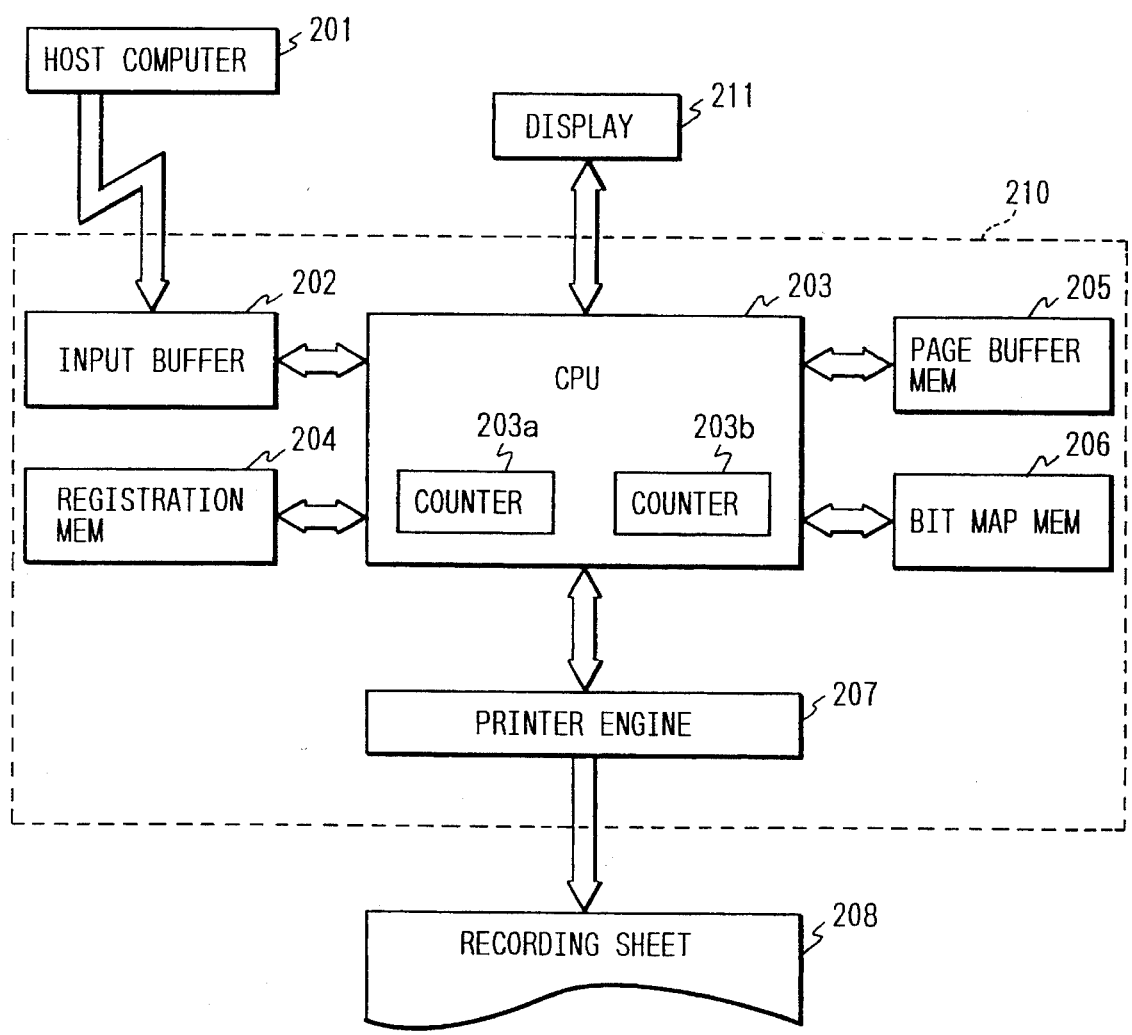
FIG. 5 is a block diagram of a control unit for a printing apparatus according to an embodiment of the present invention.

FIG. 5 is a block diagram of a control unit of a printing apparatus according to another embodiment of the present invention.

In FIG. 5, the reference numeral 201 denotes a host computer which effects the transfer of data and to which a CPU 203 for controlling the apparatus is connected via an input buffer 202 for storing the input data. Further, a registration memory 204 for storing control codes, a page buffer memory 205 for storing the input data for each page, a bit map memory 206 for storing an output image for one page, a printer engine 207 for outputting the output image in the bit map memory 206 onto a recording sheet 208, and a display 208 having a memory storing display information are connected to the CPU 203, respectively. The input buffer 202, CPU 203, registration memory 204, page buffer memory 205, bit map memory 206 and printer engine 207 constitute a control unit 201. Now, the CPU 203 has a memory for storing the control sequence shown in FIG. 8 which will be described later and performs such control sequence.

FIGS. 6A and 6B show command code systems which are control languages to be stored in the registration memory 204. Regarding each control language shown in FIGS. 6A and 6B, the CPU 203 compares the main command codes with the print data sent from the host computer 201 and stored in the input buffer 202. Here, the command codes mainly include initialization command code for the printer, sheet size change code, font selection codes and a code which may exceed the capacity of the buffering (for example, image drawing code).

Figures 7, 9:
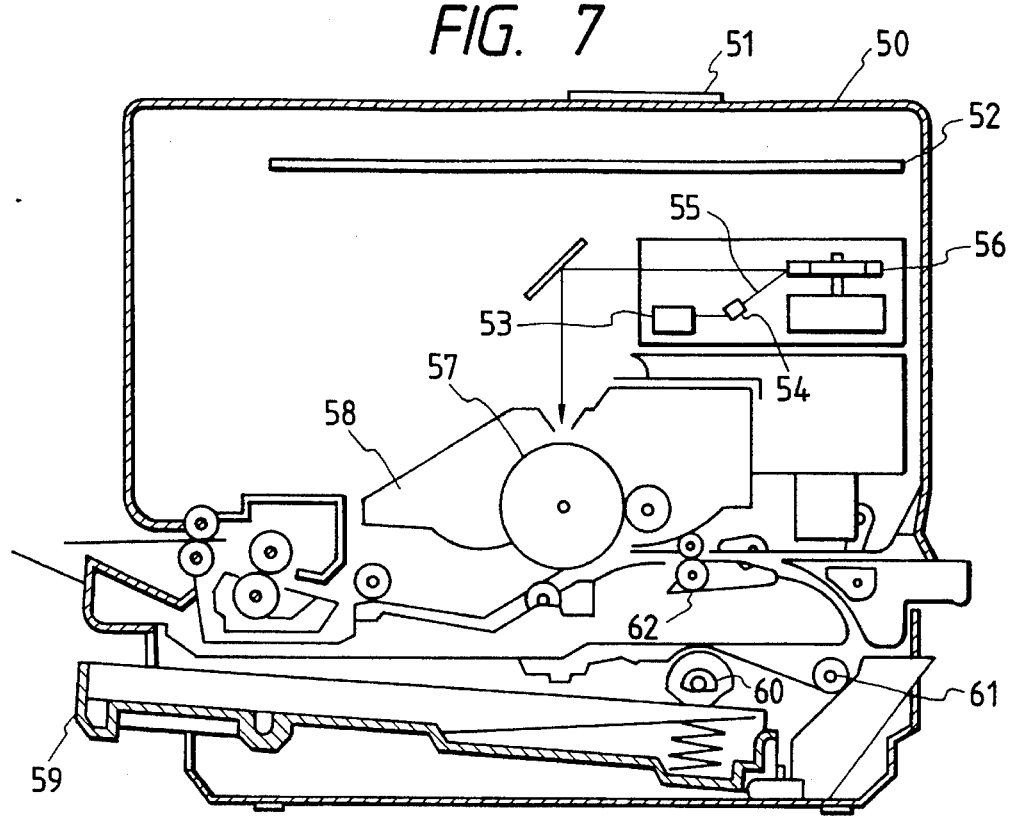
FIG. 7 is an elevational sectional view of the printing apparatus of FIG. 5.
FIG. 9 is a diagram showing whether commands and control codes can be used.

FIG. 7 is an elevational sectional view showing an external construction of a laser beam printer (LBP) which is an example of a printing apparatus according to this embodiment of the present invention, and the laser beam printer serves to store the character patterns and definite forms (form data) from a data source (not shown).

In FIG. 7, the laser beam printer 50 is so designed that it can receive and store the character information (character codes), form information or micro command supplied from the host computer 201, can form the corresponding character pattern and form pattern on the basis of such information and can form an image on the recording sheet as a recording medium. The reference numeral 51 denotes an operation panel on which switches and LED displays for operation are arranged; and 52 denotes the control unit (corresponding to the control unit 210 shown in FIG. 5) for controlling the whole laser beam printer 50 and for analyzing the character information and the like supplied from the host computer 201. The control unit 52 serves to mainly convert the character information into a corresponding video signal of the character pattern and output it to a laser driver 53.

The laser driver 53 comprises a circuit for driving a semi-conductor laser 54 so that laser beam 55 emitted from the semi-conductor laser 54 is switched ON or OFF on the basis of the input video signal. The laser beam 55 is deflected to the left and right by a rotating polygon mirror 56 to scan and expose an electrostatic drum 57. Consequently, an electrostatic image corresponding to the character pattern is formed on the electrostatic drum 57. The latent image is developed by a developing unit 58 disposed around the electrostatic drum 57 and then is transferred onto the recording sheet 208. A cut sheet is used as the recording sheet 208. The cut sheets are stacked in a sheet cassette 59 inserted into the laser beam printer 50, and each cut sheet is supplied into the printer by a sheet supply roller 60 and is sent to the electrostatic drum 57 by feed rollers 61, 62.

Next, the operation of the printer according to this embodiment will be explained with reference to FIG. 8.

Figure 8:
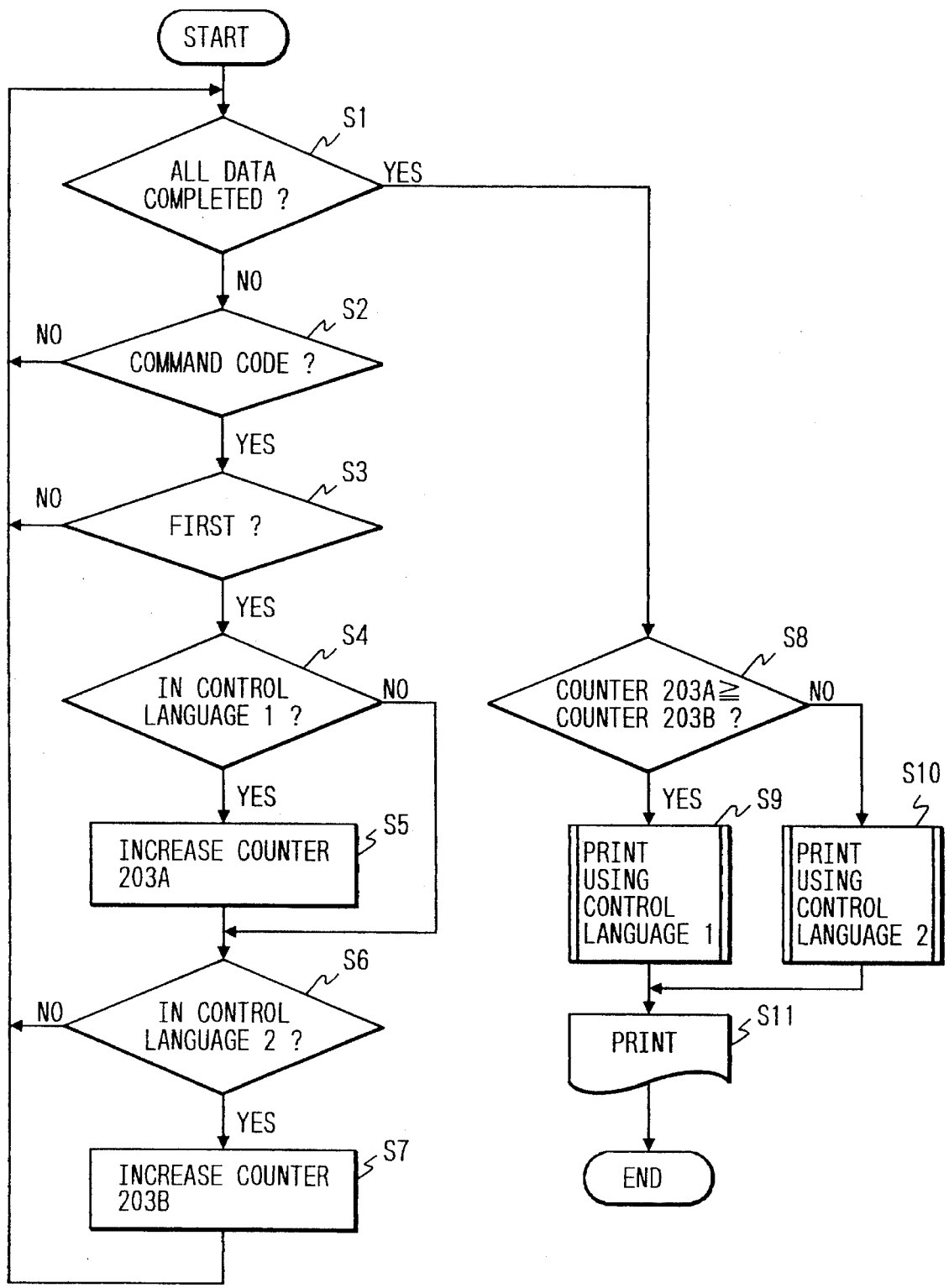
FIG. 8 is a flow chart showing a flow of discrimination processing for a control language of the input data.

Incidentally, FIG. 8 is a flow chart showing a flow of the discrimination processing for the input language. Prior to the processing, the print data has been buffered into from the host computer 201 to the input buffer 202.

First of all, in a step S1, the CPU 203 judges whether the discrimination of the print data buffered in the input buffer 202 has been finished. If not finished, in a step S2, the print data is read one bite by one bite. The read print data is compared with the command codes of the registered languages 1, 2 shown in FIGS. 6A and 6B, and, if the coincident command code is not obtained, the sequence returns to the step S1. On the other hand, in the step S2, if the command code can be extracted, in a step S3, it is judged whether the code is first (firstly received) or not. A flag for judging this is reset by the initialization command or sheet discharge command. If not first, the sequence returns to the step S1 again. If first, the sequence goes to a step S4, where it is judged whether the command code is registered as the language 1 in the registration memory 204. If registered, a counter 203a in the CPU 203 is incremented; whereas, if not registered, in a step S6, it is judged whether the command code is registered as the language 2 in the registration memory 204. If registered, in a step S7, a counter 203b is incremented. On the other hand, in the step S6, if not registered, the sequence returns to the step S1.

By repeating the above-mentioned processing, when all of the buffered print data are interpreted in the step S1, in a step S8, the counter 203a is compared with the counter 203b, with the result that it is judged that the control language relating to the counter having the larger value corresponds to the input print data, and the print processing is effected by using the control language 1 (step S9) or by using the control language 2 (step S10), and the information of the control command system is sent to the display 211, thereby displaying the control command system.

During the print processing, the display 211 displays which control command system is operated.

Incidentally, the present invention is not limited to the illustrated embodiments, but various alterations may be adopted. Such alterations are as follows, for example.

(1) The command codes of the control languages shown in FIGS. 6A and 6B may not be previously fixed, but may be registered or altered.

(2) Further, a means for deleting the command code having the low frequency of use and adding the command code having the high frequency of use on the basis of the input print data may be provided.

(3) The control command may not be checked until all of the buffered print data are completed in the step S1, but the sequence may go to the step S8 at the time when the sheet discharge code (HEX OC) is recognized.

(4) The display 211 may be a CCD display.

A mentioned above, according to the present invention, since the printing apparatus for performing the print processing on the basis of the control command included in the input data comprises the discrimination means for interpreting the control command included in the print data and for discriminating the control command system, and the print processing means for performing the print processing on the basis of the discriminated result from the discrimination means, it is possible to automatically discriminate which control command system describes the print data, to enable the interpretation matching to the control command system and to obtain the intended image. Further, the conventional operation wherein the control commands are manually switched or switched by emitting the control command prior to the printing can be omitted, thereby facilitating the switching of the control command.

Furthermore, since the command registration controlling means for performing the registration of the control command into the registration means in accordance with the frequency of use is provided, only the control commands having the high frequency of use can be registered, thus improving the utilization of the memory.

Next, further details are given with respect to embodiment 1. FIG. 9 shows examples of commands which can be used with control code analyzers 5, 6 and 7 of FIG. 1. For example, command "SI" is used for control codes and B but not used for control code C.

The flow chart of FIG. 2 is again discussed with reference to FIG. 9. Note that control code analyzers 5, 6 and 7 can analyze control codes A, B and C, respectively. For example, if the discrimination standard is set in the first level in step 1 of FIG. 2, if 30 (thirty) commands are stored in input unit 3 of FIG. 1 and if all of these 30 commands are used only for control code A, such as "XON", then step 4 of FIG. 2 is determined "YES" as clear from FIG. 9 and control code analyzer 5 is selected in step 5. This is so, besides in this typical case, even in the cases where all of the 30 commands can be used for control code A and some of them can be used only for control code A. As clearly shown in FIG. 2, a priority is given to control code analyzers 7, 6 and 5 in this sequential order. That is, a priority is given to control codes A, B and C in this sequential order.

If it cannot be determined for which control code an input command can be used in the event that the discrimination standard has been set in the first level, the same processings will be executed in step 20 of FIG. 2 with the discrimination standard being set in the second level, which is more tolerant than the first one. For example, if commands, such as "SI", "XON" and "ESC" are input, then it is judged that the input commands have been described substantially with control code A by the majority rule since most of these commands are used for control code A although they can be used also for the other control codes.

If no determination is possible even in the second level, then the processings advance to the third level where it is determined whether one or more of the input 30 commands cannot be used for control codes A, B and C. For example, it is determined for each of the input 30 commands whether the input command cannot be used for control code A. If all of the 30 commands can be used for control code A and also for the other control codes, then it can be said that there are no commands which cannot be used for control code A in the input 30 commands. In such a case, control code A is finally fixed.

If no determination is possible in each level, then it is determined that the input command shall be analyzed by a default analyzer (e.g., control code analyzer 5 of FIG. 1) in step 19 of FIG. 2.

Display 11 of FIG. 5 displays a control code analyzer determined as set forth above. Analysis can be made by the determined analyzer and finally resulting data can be visually output by the printer mechanism shown in FIG. 4.

What is claimed is:

1. A printing apparatus having a identification process for determining a kind of information input so as to identify one of a plurality of types of analyzers which should analyze the input information, said printing apparatus comprising:

control means for executing the identification process by a predetermined one of a plurality of identification standards so as to identify one of the analyzers and for executing the identification process again by a next one of the plurality of identification standards in the event that none of the analyzers has been successfully identified by the predetermined one identification standard, wherein said control means repeatedly executes the identification process by a next one of the plurality of identification standards until one of the analyzers is successfully identified; and output means for outputting information generated by analyzing the input information with the one analyzer finally identified by said control means.

2. A printing apparatus according to claim 1, wherein said control means repeatedly executes the identification process by one of the identification standards starting from a most severe one toward a least severe one and wherein said control means compares a control code included in the input information with control which can be analyzed by the analyzers.

3. A printing apparatus according to claim 1, wherein in the event that none of the analyzers has been successfully identified even by all the identification standards, said control means selects a predetermined one of the analyzers.

4. A printing apparatus according to claim 1, further comprising means for informing the outside of said apparatus of the one identification analyzer, which is used for generating the information to be output by said output means.

5. A printing method carried out in a printing apparatus having a identification process for determining a kind of information input so as to identify one of a plurality of types of analyzers which should analyze the input information, said method comprising the steps of:

executing the identification process by a predetermined one of a plurality of identification standards so as to identify one of the analyzers and executing the identification process again by a next none of the plurality of identification standards in the event that none of the analyzers has been successfully identified by the predetermined one identification standard, wherein the identification process is repeatedly executed by a next one of the plurality of identification standards until one of the analyzers is successfully identified; and outputting information generated by analyzing the input information with the one analyzer finally identified in said executing step.

6. A method according to claim 5, wherein said executing step repeatedly executes the identification process by one of the identification standards starting from a most severe one toward a least severe one and wherein said executing step compares a control code included in the input information with control codes which can be analyzed by the analyzers so as to finally identify one of the analyzers.

7. A method according to claim 5, wherein in the event that none of the analyzers has been successfully identified even by all the identification standards, said executing step selects a predetermined one of the analyzers.

8. A method according to claim 5, further comprising a step of informing the outside of the apparatus of the finally identified analyzer for user's confirmation.

9. A printing apparatus having an identification process for determining a kind of information input so as to identify one of a plurality of types of analyzers which should analyze the input information, said printing apparatus comprising:

executing means for executing the identification process using a predetermined one of a plurality of identification standards so as to identify one of the analyzers when an amount of the input information has reached a predetermined value; and control means for executing the identification process again by another one of the plurality of identification standards in the event that none of the analyzers has been successfully identified by the predetermined one identification standard.

10. A printing apparatus according to claim 9, wherein said control means repeatedly executes the identification process using one of the identification standards starting from a most severe one and progressing toward a least severe one, and wherein said control means compares a control code included in the input information with control codes which can be analyzed by the analyzers.

11. A printing apparatus according to claim 9, wherein, in the event that none of the analyzers has been successfully identified even using all the identification standards, said control means selects a predetermined one of the analyzers.

12. A printing method carried out in a printing apparatus having an identification process for determining a kind of information input so as to identify one of a plurality of types of analyzers which should analyze the input information, said method comprising the steps of:

executing the identification process using a predetermined one of a plurality of identification standards so as to identify one of the analyzers when an amount of the input information has reached a predetermined value; and controlling said executing step to execute the identification process again using another one of the plurality of identification standards in the event that none of the analyzers has been successfully identified by the predetermined one identification standard.

13. A method according to claim 12, wherein said control step repeatedly executes the identification process using one of the identification standards starting from a most severe one and progressing toward a least severe one, and wherein said executing step compares a control code included in the input information with control codes which can be analyzed by the analyzers so as to finally identify one of the analyzers.

14. A method according to claim 12, wherein, in the event that none of the analyzers has been successfully identified even using all the identification standards, said control step selects a predetermined one of the analyzers.

15. A printing apparatus having an identification process for determining a kind of information input so as to identify one of a plurality of types of analyzers which should analyze the input information, said printing apparatus comprising:

execution means for executing the identification process by a predetermined one of a plurality of identification standards so as to identify one of the analyzers after a predetermined time has elapsed from inputting of the information; and control means for executing the identification process again by another one of the plurality of identification standards in the event that none of the analyzers has been successfully identified using the predetermined one identification standard.

16. A printing apparatus according to claim 15, wherein said control means repeatedly executes the identification process by one of the identification standards starting from a most severe one and progressing toward a least severe one, and wherein said control means compares a control code included in the input information with control codes which can be analyzed by the analyzers.

17. A printing apparatus according to claim 15, wherein, in the even that none of the analyzers has been successfully identified even using all the identification standards, said control means selects a predetermined one of the analyzers.

18. A printing method carried out in a printing apparatus having an identification process for determining a kind of information input so as to identify one of a plurality of types of analyzers which should analyze the input information, said method comprising the steps of:

executing the identification process using a predetermined one of a plurality of identification standards so as to identify one of the analyzers after a predetermined time has elapsed from inputting of the information; and controlling said executing step to execute the identification process again using another one of the plurality of identification standards in the event that none of the analyzers has been successfully identified using the predetermined one identification standard.

19. A method according to claim 18, wherein said control step repeatedly executes the identification process using one of the identification standards starting from a most severe one and progressing toward a least severe one, and wherein said control step compares a control coded included in the input information with control codes which can be analyzed by the analyzers so as to finally identify one of the analyzers.

20. A method according to claim 19, wherein, in the event that none of the analyzers has been successfully identified even using all the identification standards, said control step selects a predetermined one of the analyzers.

* * * * *

UNITED STATES PATENT AND TRADEMARK OFFICE
CERTIFICATE OF CORRECTION

PATENT NO. : 5,469,373

DATED : November 21, 1995

INVENTOR(S) : MASAMI KASHIWAZAKI ET AL.

It is certified that error appears in the above-identified patent and that said Letters Patent is hereby corrected as shown below:

ON THE TITLE PAGE:

AT [54] TITLE

"DESCRIMINATES" should read --DISCRIMINATES--.

COLUMN 1

Line 2, "DESCRIMINATES" should read --DISCRIMINATES--.

COLUMN 6

Line 58, "versability." should read --versatility.--.

COLUMN 9

Line 23, "and" should read --A and--.

COLUMN 10

Line 4, "a" should read --an--.
Line 38, "a" (first occurrence) should read --an--.
Line 45, "none" should read --one--.

UNITED STATES PATENT AND TRADEMARK OFFICE
CERTIFICATE OF CORRECTION

PATENT NO. : 5,469,373

DATED : November 21, 1995

INVENTOR(S) : MASAMI KASHIWAZAKI ET AL.

It is certified that error appears in the above-identified patent and that said Letters Patent is hereby corrected as shown below:

<u>COLUMN 12</u>

Line 24, "even" should read --event--.
    Line 45, "coded" should read --code--.
    Line 48, 'claim 19," should read --claim 18,--.

Signed and Sealed this

Third Day of September, 1996

BRUCE LEHMAN

*Attest:*

*Attesting Officer*     *Commissioner of Patents and Trademarks*